(12) United States Patent
Nakada

(10) Patent No.: US 11,305,783 B2
(45) Date of Patent: Apr. 19, 2022

(54) VEHICLE CONTROL DEVICE

(71) Applicant: HITACHI AUTOMOTIVE SYSTEMS, LTD., Hitachinaka (JP)

(72) Inventor: Mitsuaki Nakada, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 101 days.

(21) Appl. No.: 16/490,755

(22) PCT Filed: Feb. 15, 2018

(86) PCT No.: PCT/JP2018/005246
§ 371 (c)(1),
(2) Date: Sep. 3, 2019

(87) PCT Pub. No.: WO2018/173561
PCT Pub. Date: Sep. 27, 2018

(65) Prior Publication Data
US 2020/0010094 A1    Jan. 9, 2020

(30) Foreign Application Priority Data

Mar. 23, 2017 (JP) .............................. JP2017-057048

(51) Int. Cl.
*B60W 50/023* (2012.01)
*G07C 5/08* (2006.01)
(Continued)

(52) U.S. Cl.
CPC ...... *B60W 50/023* (2013.01); *B60W 50/0205* (2013.01); *G07C 5/08* (2013.01);
(Continued)

(58) Field of Classification Search
CPC ........... B60W 50/023; B60W 50/0205; B60W 2556/00; B60W 2050/022;
(Continued)

(56) References Cited

U.S. PATENT DOCUMENTS 5,335,979 A * 8/1994 Naitou .................... B60T 8/885
  303/191
5,927,430 A * 7/1999 Mukai .................... B62D 5/049
  180/446

(Continued)

FOREIGN PATENT DOCUMENTS

CN      104506113 A    4/2015
JP      2010-033309 A  2/2010
(Continued)

*Primary Examiner* — Bhavesh V Amin
(74) *Attorney, Agent, or Firm* — Foley & Lardner LLP

(57) ABSTRACT

Provided is a vehicle control device which makes it possible, in a redundant configuration, to make use of a normally operating part in a failed system. A vehicle control device having a redundant configuration includes a task switching function unit configured to switch tasks to be executed when an abnormality is detected. The task switching function unit being configured to, when a diagnostic function unit determines that an abnormality has occurred in a unit of a host system, cause the unit of the failed system to stop calculation of control variable, and stop drive control for a control object, and then execute calculation other than the calculation of the control variable of the host system, and the drive control for an electric motor, so that the calculation unit of the failed system can take over at least a part of calculation of a normal system or another on-vehicle device.

15 Claims, 15 Drawing Sheets

(51) Int. Cl.
*B60W 50/02* (2012.01)
*H04L 12/40* (2006.01)

(52) U.S. Cl.
CPC ....... *H04L 12/40* (2013.01); *B60W 2050/022* (2013.01); *B60W 2050/0215* (2013.01); *B60W 2556/00* (2020.02); *H04L 2012/40215* (2013.01); *H04L 2012/40273* (2013.01)

(58) Field of Classification Search
CPC ............. B60W 2050/0215; G07C 5/08; G07C 5/0808; H04L 12/40; H04L 2012/40273; H04L 2012/40215; H04L 12/40013; B62D 5/0484; B62D 5/049; B62D 5/0481; B62D 5/0487
See application file for complete search history.

(56) References Cited

U.S. PATENT DOCUMENTS

| | | | | |
|---|---|---|---|---|
| 10,307,170 | B2* | 6/2019 | Parfett | A61B 34/76 |
| 10,595,882 | B2* | 3/2020 | Parfett | A61B 34/76 |
| 2007/0035263 | A1 | 2/2007 | Rastogi et al. | |
| 2011/0156627 | A1 | 6/2011 | Nakamura et al. | |
| 2012/0221183 | A1* | 8/2012 | Wu | B60L 15/20 701/22 |
| 2013/0090813 | A1* | 4/2013 | Kanekawa | B62D 5/0481 701/43 |
| 2013/0332029 | A1* | 12/2013 | Kim | B62D 5/0484 701/41 |
| 2014/0288779 | A1* | 9/2014 | Di Cairano | B62D 15/0235 701/42 |
| 2015/0084570 | A1 | 3/2015 | Yoshimichi | |
| 2015/0381099 | A1 | 12/2015 | Khanin et al. | |
| 2016/0001781 | A1* | 1/2016 | Fung | B60K 28/02 701/36 |
| 2017/0217481 | A1* | 8/2017 | Asao | H02P 25/22 |
| 2018/0360470 | A1* | 12/2018 | Parfett | A61B 17/07207 |
| 2019/0125365 | A1* | 5/2019 | Parfett | A61B 17/07207 |

FOREIGN PATENT DOCUMENTS

| | | |
|---|---|---|
| JP | 2012-111474 A | 6/2012 |
| JP | 2015-061458 A | 3/2015 |
| WO | WO-2016/063367 A1 | 4/2016 |

* cited by examiner

VEHICLE CONTROL DEVICE

TECHNICAL FIELD

The present invention relates to a vehicle control device with redundancy.

BACKGROUND ART

Some vehicle control devices have redundancy or a redundant configuration to enhance reliability and improve vehicle safety. For example, Patent Document 1 discloses a motor control device equipped with two power conversion circuit systems. This motor control device is applied to an electric power steering device. In the electric power steering device, when the two systems have a temperature difference not less than a predetermined threshold value, the motor control device stops the operation of an inverter in one system that is detected to have a higher temperature, or reduces a limit value of the electric current.

REFERENCE DOCUMENT LIST

Patent Document

Patent Document 1: JP 2015-61458 A

SUMMARY OF THE INVENTION

PROBLEM TO BE SOLVED BY THE INVENTION

The vehicle control device having a redundant configuration can improve vehicle safety by, even if a failure or other such problem occurs in one system, stopping the failed system and causing the other normal system to continue the control.

However, a normally operating part of the failed system, if any, is not used, which leads to a waste of hardware resources.

The present invention has been made in view of the above circumstances and accordingly, an object of the present invention is to provide a vehicle control device that can make use of a normally operating part of a failed system in a redundant configuration.

MEANS FOR SOLVING THE PROBLEM

A vehicle control device according to an aspect of the present invention includes an abnormal state-specific task executing unit configured to, when an abnormality determination unit determines that an abnormality has occurred in an actuation unit of a host system, or an output signal of a sensor thereof, cause a control variable calculation unit to stop calculation of control variable, and cause a drive control unit to stop drive control for an actuation unit, and then execute calculation other than the calculation of control variable and the drive control for the actuation unit.

EFFECTS OF THE INVENTION

According to the present invention, the vehicle control device having a redundant configuration includes the abnormal state-specific task executing unit, so that a normally operating part of a failed system can take over at least a part of functions assigned to a normal system.

MODE FOR CARRYING OUT THE INVENTION

Embodiments of the present invention will be described below with reference to the drawings.

Figure 1:
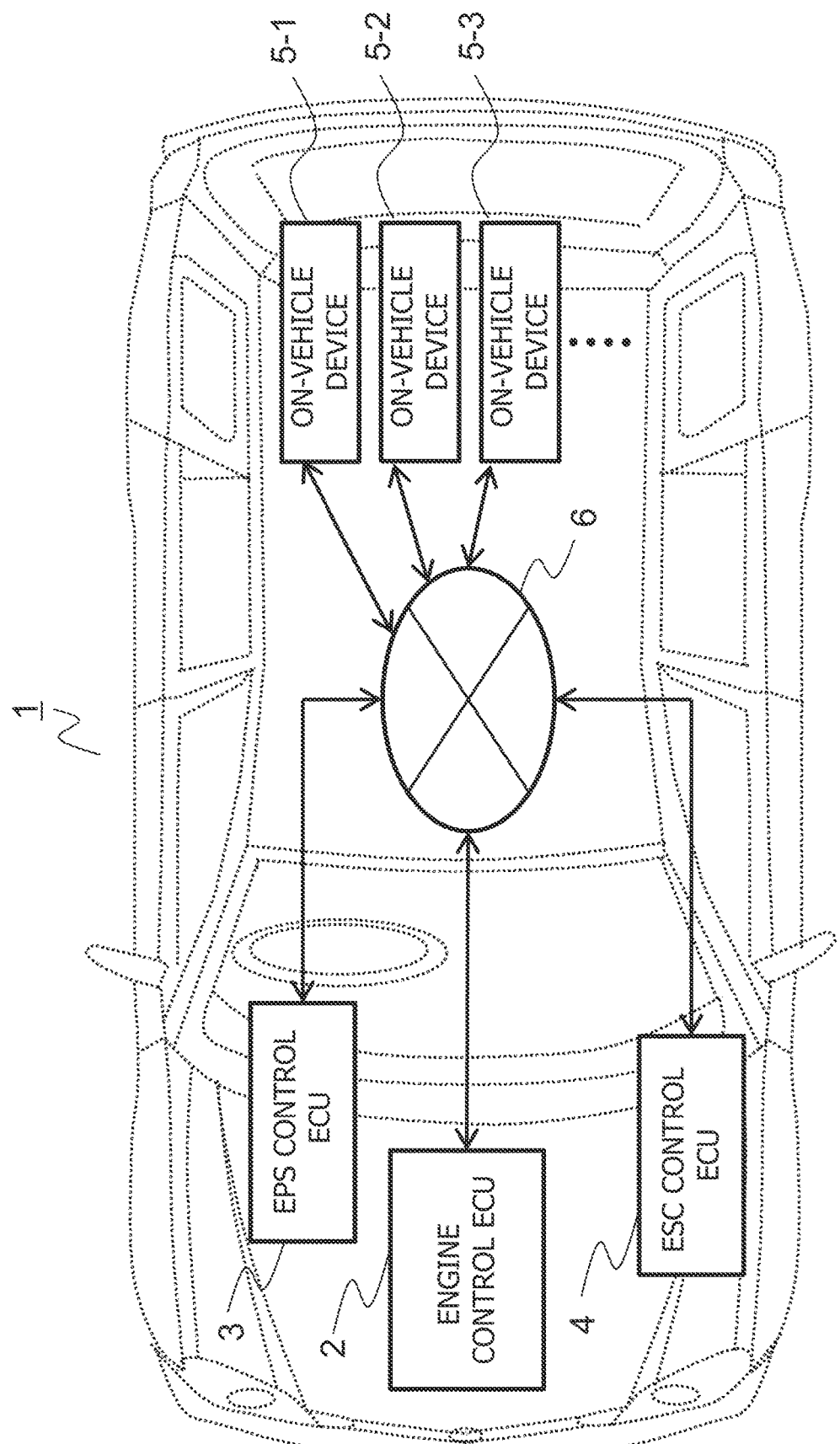
FIG. 1 is a view illustrating a schematic system configuration of a vehicle control device according to an embodiment of the present invention.

FIG. 1 is a view illustrating a system configuration of a vehicle control device according to an embodiment of the present invention. In FIG. 1, main parts relevant to the present invention are extracted and schematically illustrated. A vehicle 1 has mounted thereon an engine control electronic control unit (ECU) 2, an electric power steering (EPS) control ECU 3, an electronic stability control (ESC) control ECU 4, and various types of on-vehicle devices 5-1, 5-2, 5-3, . . . . These components are mutually connected via a communication network 6 such as a controller area network (CAN).

Figure 2:
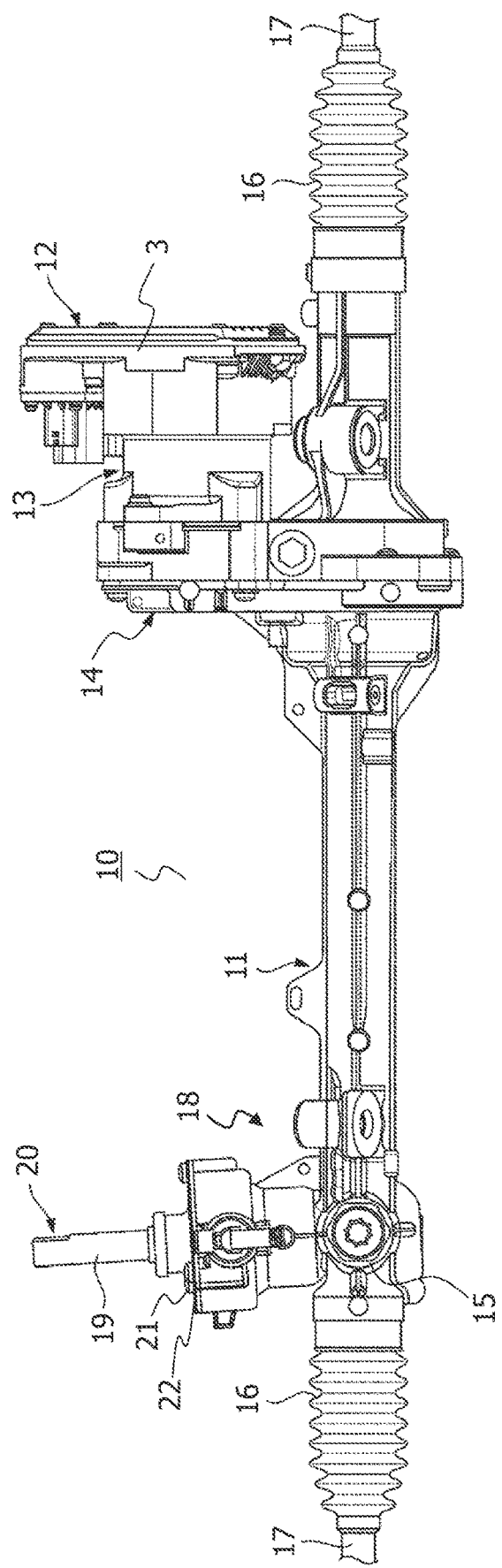
FIG. 2 is a front view illustrating an electric power steering device to which the vehicle control device according to the embodiment of the present invention is applied.

FIG. 2 is a front view illustrating an electric power steering device to which the vehicle control device is applied, specifically, illustrating an example of an electric motor that controls a corresponding on-vehicle device to assist a driver's steering force. An electric power steering device 10 includes, for example, a rack housing 11, a motor housing 12, an electric motor (three-phase blushless motor) 13 having coil sets of two systems, a decelerator 14, a pinion 15, dust boots 16, 16, tie rods 17, 17, and a steering mechanism 18. Rack housing 11 accommodates therein a pinion shaft and a rack bar (not shown), and a part of a steering shaft 19. Further, motor housing 12 accommodates therein electric motor 13 and EPS control ECU 3. With this configuration, rotation of electric motor 13 is reduced by decelerator 14, and is transferred to steering mechanism 18 so as to assist a steering force of a driver of vehicle 1.

Steering mechanism 18 includes steering shaft 19, a pinion shaft, and a torsion bar. Steering shaft 19 rotates integrally with a steering wheel. Steering torque sensors 21 and steering angle sensors 22 are attached to a steering axle 20 as steering sensors that serve to detect how steering mechanism 18 controls steering. Specifically, steering torque sensor pair 21 and steering angle sensor pair 22 are attached. Steering torque sensors 21 detect a steering torque (torsion bar torque) generated in steering mechanism 18 based on a torsion amount of the torsion bar. Steering angle sensors 22 detect a steering angle during steering.

The pinion shaft is connected to steering shaft 19 via the torsion bar. Dust boots 16, 16 are made of, for example, rubber, and have a circular bellows shape. Outer ends of dust boots 16, 16 in a vehicle width direction are fixed to inner ends of tie rods 17, 17 in the vehicle width direction. The other ends of pair of tie rods 17, 17 are connected to both ends of the rack bar.

Figure 3:
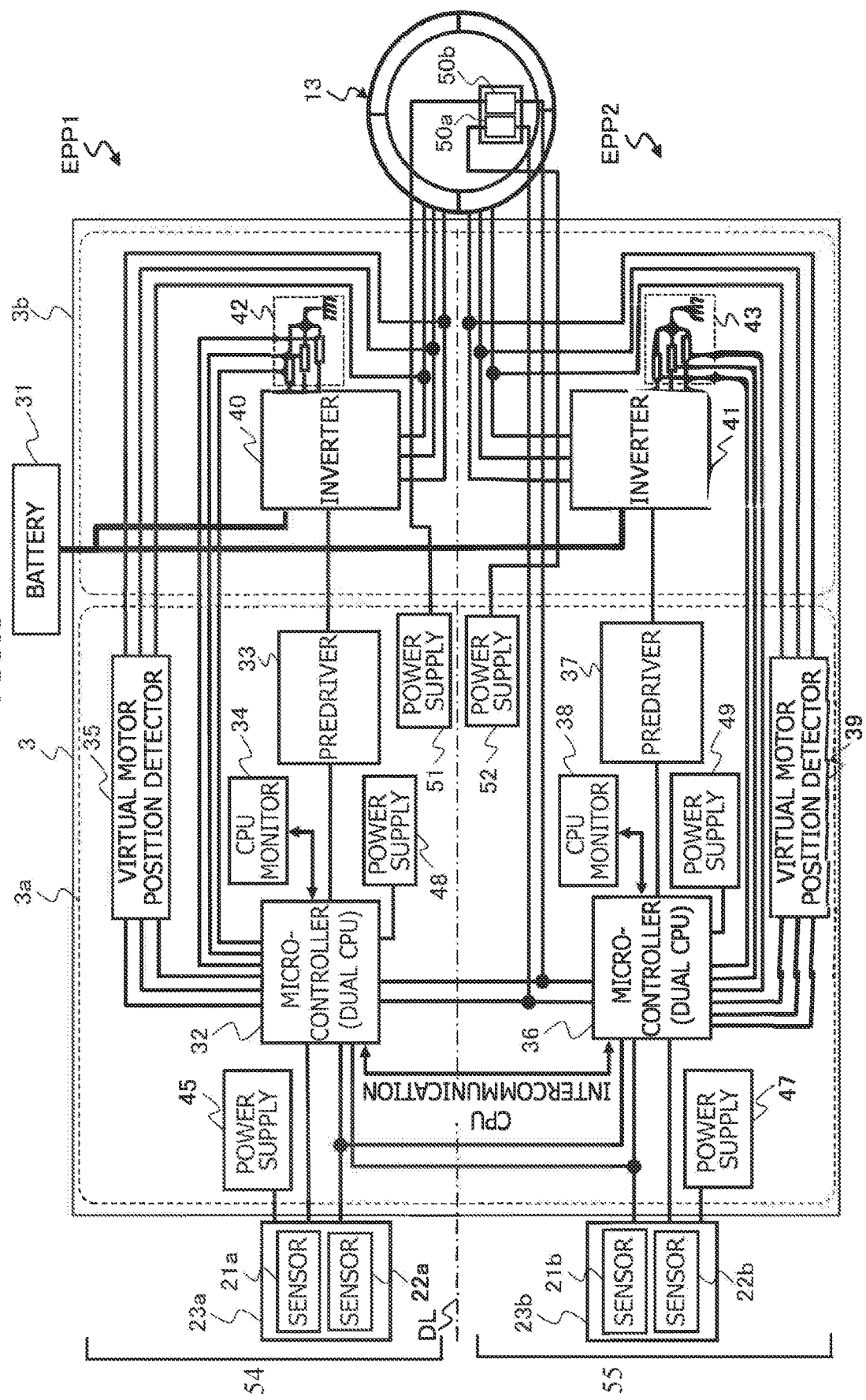
FIG. 3 is a block diagram illustrating a configuration example of an EPS control ECU in the configurations of FIGS. 1 and 2.

FIG. 3 is a block diagram illustrating a configuration example of EPS control ECU 3 in the configurations of FIGS. 1 and 2. EPS control ECU 3 includes a logic circuit unit 3a mounted on a printed wiring board, and a power circuit unit 3b mounted on a metal printed board. Logic circuit unit 3a operates with an internal power supply voltage generated by, for example, a power supply IC. Power control unit 3b operates with an external power supply voltage from a battery 31. Power control unit 3b takes advantage of the metal printed board to promote radiation of heat generated in a power device that may generate a large amount of heat, and also to improve the reliability of electronic components with respect to heat.

Logic circuit unit 3a and power circuit unit 3b have a redundant configuration including a unit EPP1 of a first system and a unit EPP2 of a second system, which lie on each side of dashed line DL. Logic circuit unit 3a of unit EPP1 in the first system includes, for example, a microcontroller (in this example, a dual-core CPU) 32, a predriver 33, a CPU monitor 34, and a virtual motor position detector (inductance detector) 35. Power control unit 3b of unit EPP1 in the first system includes an inverter 40 and a three-shunt current detecting unit 42. Current detecting unit 42 is used as a motor phase current sensor and a primary current sensor.

Likewise, logic circuit unit 3a of unit EPP2 in the second system includes, for example, a microcontroller (in this example, a dual-core CPU) 36, a predriver 37, a CPU monitor 38, and a virtual motor position detector (inductance detector) 39. Power control unit 3b in the second system includes an inverter 41 and a three-shunt current detecting unit 43. Current detecting unit 43 is used as a motor phase current sensor and a primary current sensor.

A first steering sensor 23a (steering torque sensor 21a and steering angle sensor 22a) of unit EPP1 receives a power supply voltage from an internal operational power supply 45 of logic circuit unit 3a, and a detection result thereof is transmitted to both microcontrollers 32, 36. Further, a second steering sensor 23b (steering torque sensor 21b and steering angle sensor 22b) of unit EPP2 receives a power supply voltage from an internal operational power supply 47 of logic circuit unit 3a, and a detection result thereof is transmitted to both microcontrollers 36, 32. Here, steering torque sensor 21a and steering angle sensor 22a as well as steering torque sensor 21b and steering angle sensor 22b can respectively be dual sensors supported for a corresponding dual-core CPU. Microcontrollers 32, 36 receive a power supply voltage from internal operational power supplies 48, 49. Microcontrollers 32, 36 transmit and receive a status signal and a sensor signal to and from each other via communication between microcomputers hereinafter referred to as "microcomputer intercommunication" (CPU intercommunication).

Electric motor 13 includes motor rotational angle sensors (dual motor position sensors) 50a, 50b. Motor rotational angle sensors 50a, 50b receive a power supply voltage from internal operational power supplies 51, 52 provided in logic circuit unit 3a, and detection results thereof are transmitted to microcontrollers 32, 36.

Microcontroller 32 generates a pulse signal to execute pulse width modulation (PWM) control based on, for example, three-phase currents detected by current detecting unit 42, a rotational position of a rotor, detected by the virtual motor position detector 35, and a motor rotational angle detected by motor rotational angle sensors 50a, 50b. The pulse signal output from microcontroller 32 is transmitted to predriver 33. Further, microcontroller 36 generates a pulse signal to execute PWM control based on, for example, the phase currents detected by the current detecting unit 43, the rotational position of the rotor, detected by virtual motor position detector 39, and the motor rotational angle detected by motor rotational angle sensors 50a, 50b. The pulse signal output from microcontroller 36 is transmitted to predriver 37.

An operation of microcontroller 32 is examined by CPU monitor 34, and an operation of microcontroller 36 is examined by CPU monitor 38. CPU monitors 34, 38 are, for example, timers (called "watch dog"), and serve to continuously monitor whether microcontrollers 32, 36 operate normally.

The pulse signal (PWM signal) output from predriver 33 is transmitted to inverter 40, and the pulse signal (PWM signal) output from predriver 37 is transmitted to inverter 41. Inverters 40, 41 drive electric motor 13 having coil sets 13a, 13b of the two systems. Current detecting units 42, 43 each detect three-phase currents generated during driving of electric motor 13, and transmit detection signals to microcontrollers 32, 36, respectively for feedback control. Then, microcontrollers 32, 36 calculate a total amount of current supplied from battery 31 based on the three-phase current. Further, virtual motor position detectors 35, 39 each detect a rotation position of the rotor based on a voltage at a neutral point of a stator coil, and transmit detection signals to microcontrollers 32, 36, respectively. The detection signals of virtual motor position detectors 35, 39 are used to examine detection results output from current detecting units 42, 43 and motor rotational angle sensors 50a, 50b, and used for backup of a failed sensor.

Figure 4:
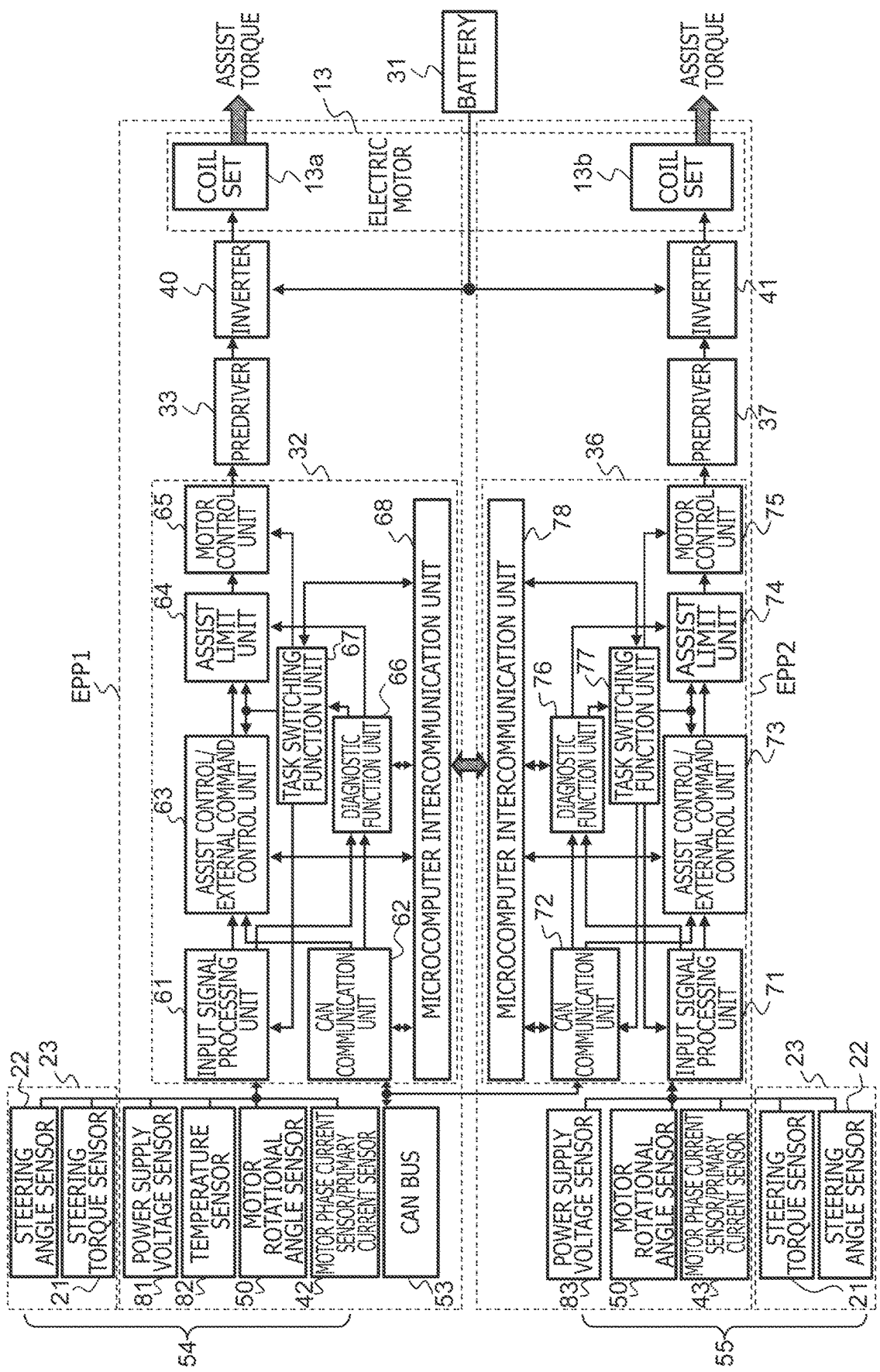
FIG. 4 is a functional block diagram of the vehicle control device according to the embodiment of the present invention.

FIG. 4 is a functional block diagram of the vehicle control device according to the embodiment of the present invention. FIG. 4 illustrates details of the configuration example of microcontrollers 32, 36 of FIG. 3. Unit EPP1 in the first system includes, for example, a sensor 54, microcontroller (first microcomputer) 32, predriver 33, inverter 40, and coil set 13a of electric motor 13. Further, unit EPP2 in the second system includes, for example, a sensor 55, microcontroller (second microcomputer) 36, predriver 37, inverter 41, and coil set 13b of electric motor 13.

Sensor 54 serves to detect a state variable indicating an operational state of a vehicle, and includes steering torque sensor 21 (21a, 21b), steering angle sensor 22 (22a, 22b), motor rotational angle sensor 50 (50a, 50b), and motor phase current sensor/primary current sensor (first current detecting unit) 42 described above as well as a power supply voltage monitor 81 and a temperature sensor 82. Likewise, sensor 55 serves to detect a state variable indicating an operational state of the vehicle, and includes steering torque sensor 21 (21a, 21b), steering angle sensor 22 (22a, 22b), motor rotational angle sensor 50 (50a, 50b), and motor phase current sensor/primary current sensor (second current detecting unit) 43 described above as well as a power supply voltage monitor 83.

Microcontroller 32 controls coil set 13a of electric motor 13 as a first actuation unit based on an output signal of sensor 54. Microcontroller 32 includes, for example, an input signal processing unit 61, a CAN communication unit 62, an assist control/external command control unit 63, an assist limit unit 64, a motor control unit 65, a diagnostic function unit 66, a task switching function unit 67, and a microcomputer intercommunication unit 68. Likewise, microcontroller 36 controls coil set 13b of electric motor 13 as a second actuation unit based on an output signal of sensor 55. Microcontroller 36 includes, for example, an input signal processing unit 71, a CAN communication unit 72, an assist control/external command control unit 73, an assist limit unit 74, a motor control unit 75, a diagnostic function unit 76, a task switching function unit 77, and a microcomputer intercommunication unit 78. CAN communication units 62, 72 are connected to the other ECUs or on-vehicle devices 5-1, 5-2, 5-3, . . . via a CAN bus 53 (communication network 6) as illustrated in FIG. 1.

An output signal of each sensor in sensor 54 is input to input signal processing unit (first sensor signal input unit) 61, and converted into a digital signal by A/D conversion, for example. An output signal of input signal processing unit 61 is transmitted to assist control/external command control unit (first control variable calculation unit) 63. Assist control/external command control unit 63 calculates a first control variable to control driving of electric motor 13, based on the output signal of sensor 54. The first control variable includes the degree of assistance to a driver's steering force, and the amount of steering force that is applied in response to an external command regardless of a driver's steering operation, for example, in a self-parking system. A signal output from the assist control/external command control unit 63 is transmitted to motor control unit (first drive control unit) 65 via assist limit unit 64. Motor control unit 65 controls driving of electric motor 13 via predriver 33 and inverter 40 based on the first control variable.

Diagnostic function unit (first abnormality determination unit) 66 receives the output signals of input signal processing unit 61 and CAN communication unit 62, to thereby determine presence/absence of an abnormality in predriver 33, inverter 40, coil set 13a, or an output signal of sensor 54. An output signal of diagnostic function unit 66 is transmitted to assist limit unit 64 and task switching function unit (abnormal state-specific task executing unit) 67, to thereby limit assistance to a steering force by electric motor 13, and also switch tasks of the individual units. Task switching function unit 67 monitors an abnormality confirmation flag of diagnostic function unit 66, and switches tasks by changing a program to be executed when the abnormality confirmation flag is set, for example. When diagnostic function unit 66 determines that an abnormality has occurred in predriver 33, inverter 40, coil set 13a, or the output signal of sensor 54, task switching function unit 67 causes assist control/external command control unit 63 to stop calculating the first control variable, and causes motor control unit 65 to stop drive control for electric motor 13 executed via predriver 33 and inverter 40. Then, task switching function unit 67 causes assist control/external command control unit 63 to perform calculation other than the calculation of the first control variable and other than the drive control for electric motor 13.

Further, an output signal of each sensor in sensor 55 is input to input signal processing unit (second sensor signal input unit) 71, and is converted into a digital signal by A/D conversion, for example. An output signal of input signal processing unit 71 is transmitted to assist control/external command control unit (second control variable calculation unit) 73. Assist control/external command control unit 73 calculates a second control variable to control driving of the second actuation unit of the electric motor, based on the output signal of sensor 55. The second control variable includes the degree of assistance to a driver's steering force, and the amount of steering force that is applied in response to an external command regardless of a driver's steering operation, for example, in a self-parking system. A signal output from assist control/external command control unit 73 is transmitted to motor control unit (second drive control unit) 75 via assist limit unit 74. Motor control unit 75 controls driving of electric motor 13 via predriver 37 and inverter 41 based on the second control variable.

Diagnostic function unit (second abnormality determination unit) 76 receives the output signals of input signal processing unit 71 and CAN communication unit 72, to determine presence/absence of an abnormality in predriver 37, inverter 41, coil set 13b, or an output signal of sensor 55. An output signal of diagnostic function unit 76 is transmitted to assist limit unit 74 and task switching function unit (abnormal state-specific task executing unit) 77, to thereby limit assistance to a steering force by electric motor 13, and also switch tasks of the individual units. Task switching function unit 77 monitors an abnormality confirmation flag of diagnostic function unit 76, and switches tasks by changing a program to be executed when the abnormality confirmation flag is set. When diagnostic function unit 76 determines that an abnormality has occurred in predriver 37, inverter 41, coil set 13b, or an output signal of sensor 55, task switching function unit 77 causes assist control/external command control unit 73 to stop calculating the second control variable, and causes motor control unit 75 to stop drive control for electric motor 13 executed via predriver 37 and inverter 41. Then, task switching function unit 77 causes assist control/external command control unit 73 to perform calculation other than the calculation of the second control variable, and other than the drive control for electric motor 13.

Microcomputer intercommunication units (CPU intercommunication units) 68, 78 allow microcontroller 32 and microcontroller 36 to transmit and receive signals to and from each other. Microcomputer intercommunication unit 68 exchanges data with diagnostic function unit 66 and task switching function unit 67, and also communicates with the other ECUs or on-vehicle devices via CAN communication unit 62 and CAN bus 53. Further, microcomputer intercommunication unit 78 exchanges data with diagnostic function unit 76 and task switching function unit 77, and also communicates with the other ECUs or on-vehicle devices via CAN communication unit 72 and CAN bus 53.

Task switching function unit 67 receives a task switch command from microcontroller 36 via microcomputer intercommunication units 78, 68, and transmits information about completion of task transition, to microcontroller 36 via microcomputer intercommunication units 68, 78. Further, task switching function unit 77 receives a task switch command from microcontroller 32 via microcomputer intercommunication units 68, 78, and transmits information about completion of task transition, to microcontroller 32 via microcomputer intercommunication units 78, 68.

Further, when an abnormality has occurred in predriver 33, inverter 40, coil set 13*a*, or sensor 54, task switching function unit 67 outputs a calculation stop command to assist control/external command control unit 63, assist limit unit 64, and motor control unit 65 to stop calculation. Likewise, when an abnormality has occurred in predriver 37, inverter 41, coil set 13*b,* or sensor 55, task switching function unit 77 outputs a calculation stop command to assist control/external command control unit 73, assist limit unit 74, and motor control unit 75 to stop calculation.

Figure 5:
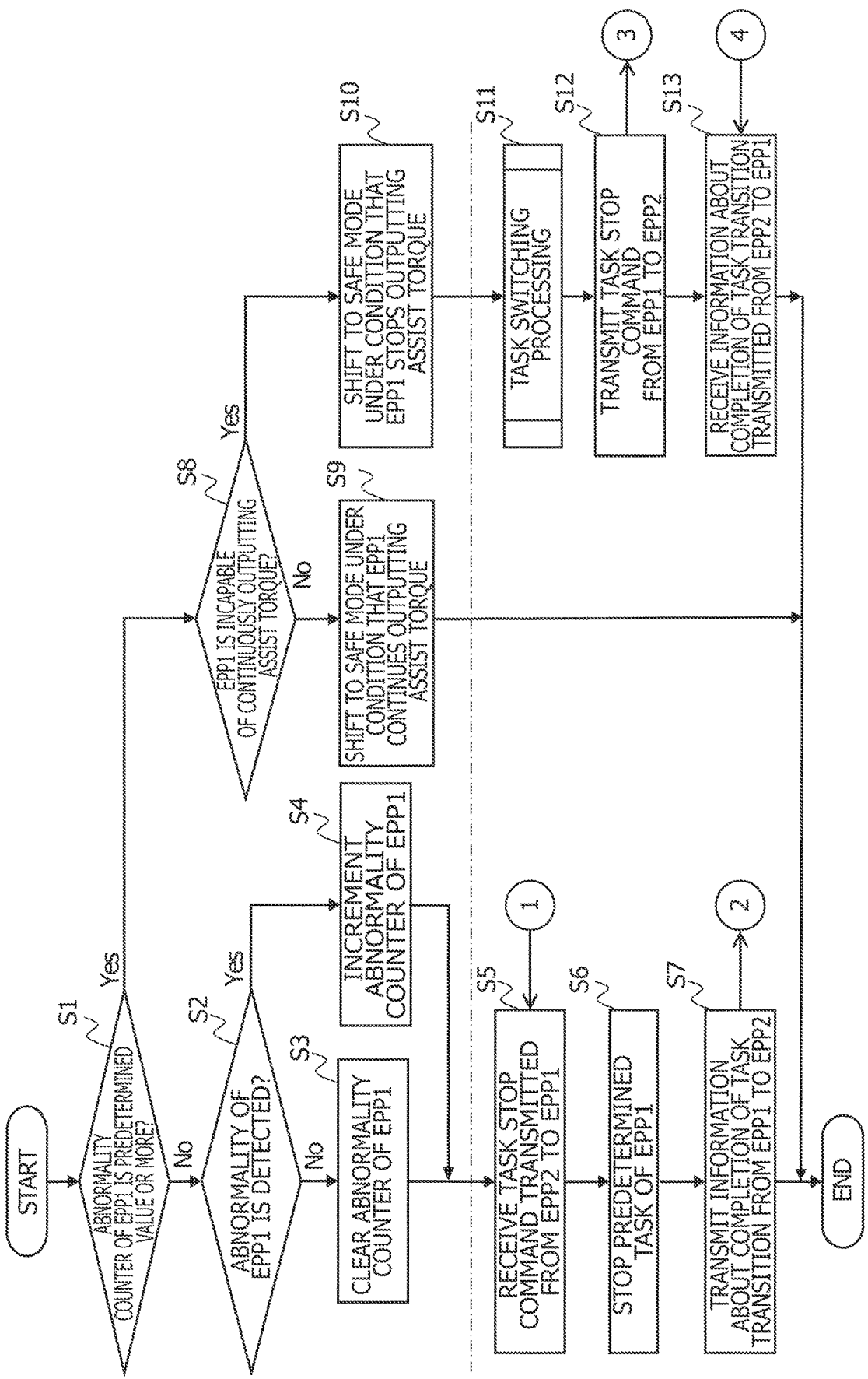
FIG. 5 is a flowchart illustrating an operation of a first microcontroller in the vehicle control device of FIG. 4.

FIG. 5 is a flowchart illustrating an operation of microcontroller 32 of unit EPP1 in the first system of the vehicle control device of FIG. 4. Steps S1 to S4 and S8 to S10 correspond to an operation of diagnostic function unit 66, and steps S5 to S7 and S11 to S13 correspond to an operation of task switching function unit 67. In step S1, it is determined whether a value of an abnormality counter incorporated in diagnostic function unit 66 is a predetermined value or more. If the determination result shows that the counter value is less than the predetermined value, whether an abnormality has been detected in unit EPP1 is determined (step S2). If it is determined that unit EPP1 has no abnormality, the abnormality counter for unit EPP1 is cleared (step S3). If it is determined that unit EPP1 has an abnormality, the abnormality counter for unit EPP1 is incremented (step S4).

Next, task switching function unit 67 receives a task stop command directed to microcontroller 32 of unit EPP1 from microcontroller 36 of unit EPP2 (step S5). Microcontroller 32 of unit EPP1, which receives the task stop command, executes predetermined task stop processing (step S6). Subsequently, microcontroller 32 of unit EPP1 transmits information about completion of task transition, to microcontroller 36 of unit EPP2, and the processing is terminated (step S7).

On the other hand, if it is determined in step S1 that the value of the abnormality counter is the predetermined value or more, it is determined whether unit EPP1 is incapable of continuously outputting an assist torque (step S8). If NO, an operational mode is shifted to a safe mode under the condition that unit EPP1 continues outputting an assist torque, and the processing is terminated (step S9). If YES because of a failure in sensor 54, an internal memory of microcontroller 32, predriver 33, inverter 40, or coil set 13*a,* for example, then the operational mode is shifted to a safe mode under the condition that unit EPP1 stops outputting an assist torque (step S10).

Subsequently, task switching function unit 67 executes task switching processing (step S11). In subsequent step S12, microcontroller 32 of unit EPP1 transmits a task stop command to microcontroller 36 of unit EPP2. In subsequent step S13, microcontroller 32 of unit EPP1 receives information about completion of the task transition from microcontroller 36 of unit EPP2, and the processing is terminated.

Figure 6:
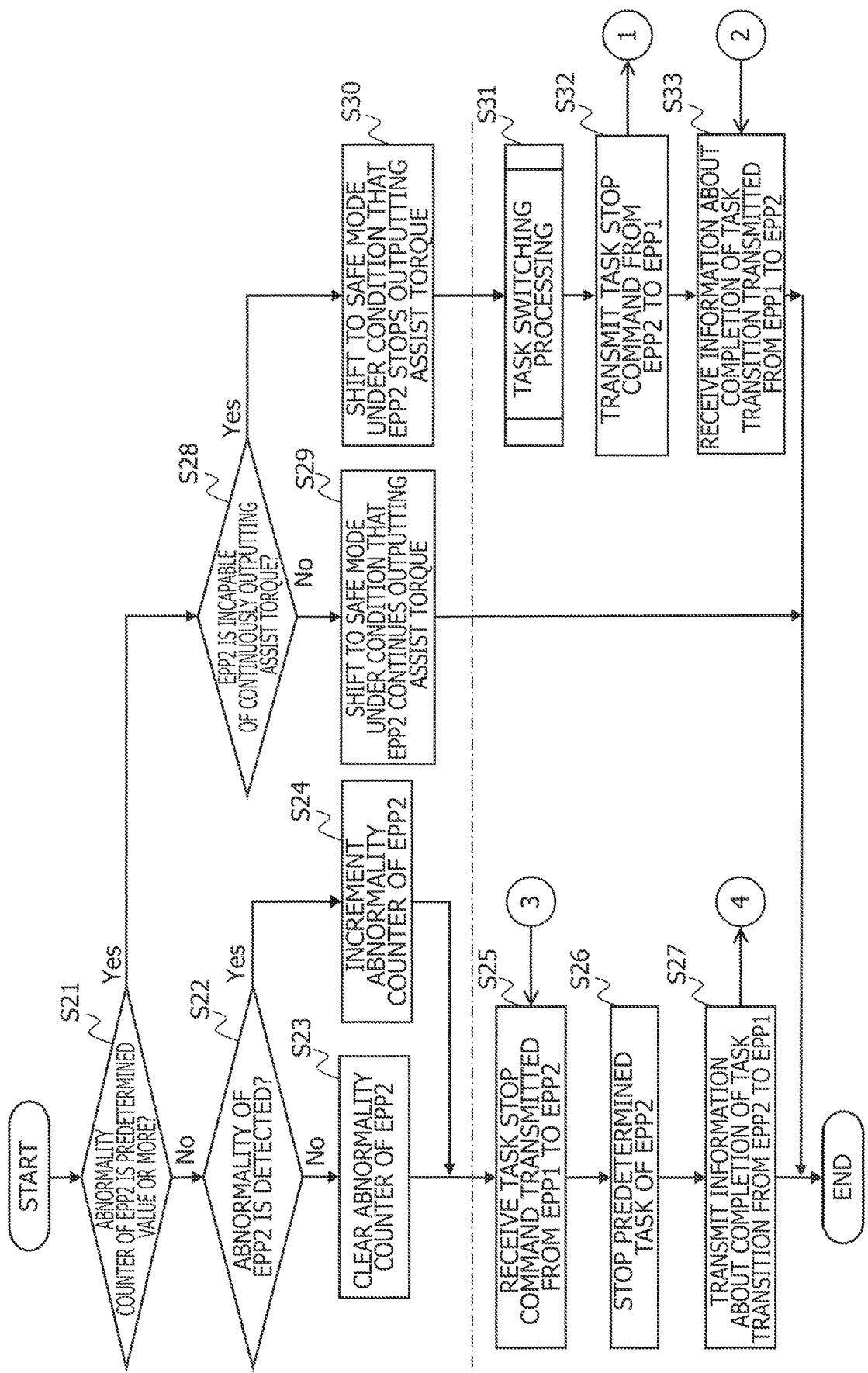
FIG. 6 is a flowchart illustrating an operation of a second microcontroller in the vehicle control device of FIG. 4.

FIG. 6 is a flowchart illustrating an operation of microcontroller 36 of unit EPP2 in the second system of the vehicle control device of FIG. 4. Steps S21 to S24 and S28 to S30 correspond to an operation of diagnostic function unit 76, and steps S25 to S27 and S31 to S33 correspond to an operation of task switching function unit 77. In step S21, it is determined whether a value of an abnormality counter incorporated in diagnostic function unit 76 is a predetermined value or more. If the determination result is less than the predetermined value, whether an abnormality has been detected in unit EPP2 is determined (step S22). If it is determined that unit EPP2 has no abnormality, the abnormality counter for unit EPP2 is cleared (step S23). In contrast, if it is determined that unit EPP2 has an abnormality, the abnormality counter for unit EPP2 is incremented (step S24).

Next, task switching function unit 77 receives a task stop command directed from microcontroller 32 of unit EPP1 to microcontroller 36 of unit EPP2 (step S25). When receiving the task stop command, microcontroller 36 of unit EPP2 stops a predetermined task (step S26). After that, microcontroller 36 of unit EPP2 transmits information about completion of task transition to microcontroller 32 of unit EPP1, and the processing is terminated (step S27).

On the other hand, if it is determined in step S21 that the value of the abnormality counter is the predetermined value or more, whether unit EPP2 is incapable of continuously outputting an assist torque is determined (step S28). If NO, the operational mode is shifted to a safe mode under the condition that unit EPP2 continues outputting an assist torque, and the processing is terminated (step S29). If YES because of a failure in sensor 54, an internal memory of microcontroller 36, predriver 37, inverter 41, or coil set 13*b,* for example, the operational mode is shifted to a safe mode under the condition that unit EPP2 stops outputting an assist torque (step S30).

Next, task switching function unit 77 performs task switching processing (step S31). In subsequent step S32, microcontroller 36 of unit EPP2 transmits a task stop command to microcontroller 32 of unit EPP1. In subsequent step S33, microcontroller 36 of unit EPP2 receives information about completion of task transition, and the processing is terminated.

Figure 7:
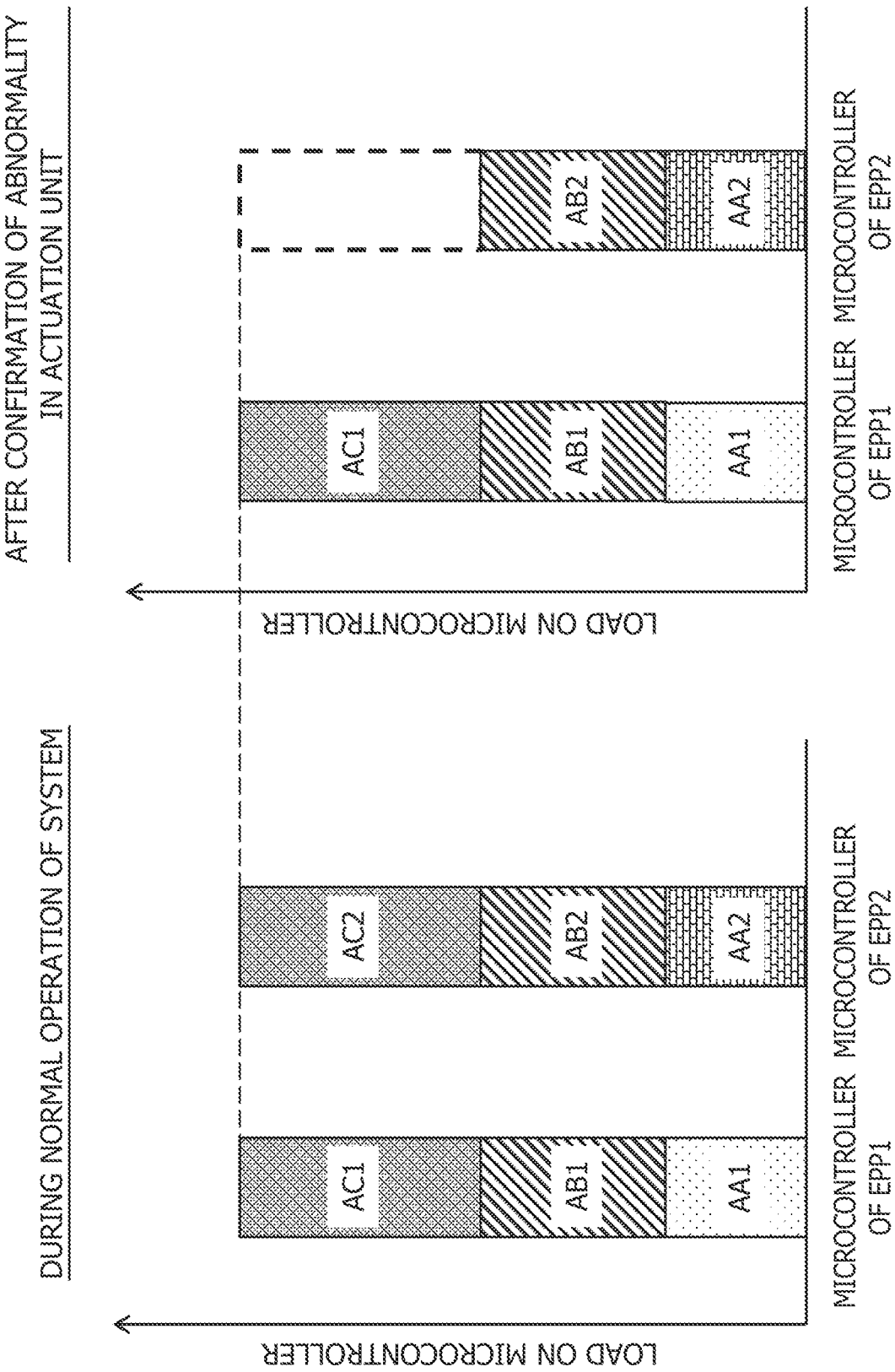
FIG. 7 is an explanatory graph showing a change in computation load applied to microcontrollers in a conventional vehicle control device, i.e., a change between a load applied during a normal operation and that applied when an abnormality is confirmed.
Figure 8:
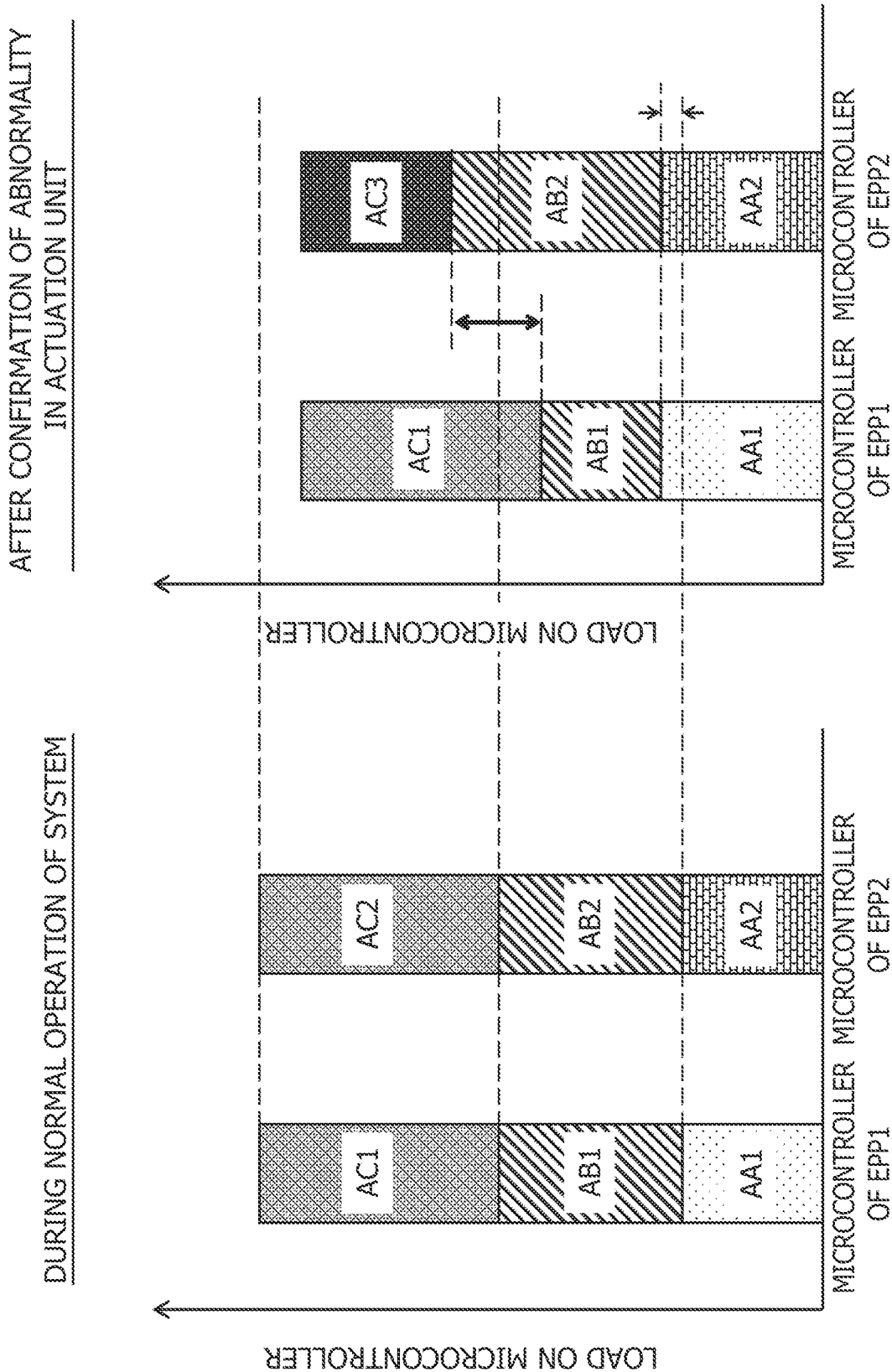
FIG. 8 is an explanatory graph showing a change in computation load applied to microcontrollers in the vehicle control device according to the embodiment of the present invention, i.e., a change between a load applied during a normal operation and that applied when an abnormality is confirmed.

FIGS. 7 and 8 show, in contrast, changes in computation load applied to a microcontroller, i.e., changes between a load applied during a normal operation and that applied when an abnormality is confirmed, in a conventional vehicle control device and in the vehicle control device according to the embodiment of the present invention. As shown in FIG. 7, in the conventional vehicle control device, microcontroller 32 of unit EPP1 and microcontroller 36 of unit EPP2 receive substantially equal loads AA1, AA2, substantially equal loads AB1, AB2, and substantially equal loads AC1, AC2 when the system is normally operating. Here, the loads AA1, AA2, the loads AB1, AB2, and the loads AC1, AC2 are involved in an operation of each microcontroller, in a failure diagnosis, and in control of an assist torque to be output, respectively.

If an abnormality of the second actuation unit is confirmed, for example, the load AC2 involved in the control of an assist torque to be output is not required and thus is not applied, but the processing of failure diagnosis is continued, and the load AB2 is still applied, and hence, hardware resources are wasted.

In contrast, as shown in FIG. 8, the vehicle control device of the present invention utilizes a load AC3 involved in control of an assist torque to be output, for supporting the other unit. This makes it possible to reduce loads on the microcontrollers of unit EPP1 and unit EPP2.

Note that the task switching processing increases somewhat the loads AA1, AA2 involved in the operation of the microcontroller compared with the conventional device. Further, during data recording, for example, the load AB2 involved in the failure diagnosis is increased, but the load AB1 is decreased through optimized distribution of computation processing. Consequently, the total load of unit EPP1 and unit EPP2 is smaller than that during a normal operation of the system.

With the above configuration, if it is determined that an abnormality has occurred in the predriver, the inverter, the coil set, or an output signal of the sensor of one unit, the microcontroller of the other unit is caused to stop calculating control variables, so that an unnecessary calculation can be reduced and also, a calculation capacity thus saved can be used for calculation required to execute other tasks. Hence, limited calculation capacities of the respective microcontrollers can be efficiently utilized.

Regarding the task switching function unit, if the diagnostic function unit determines that an abnormality has occurred in the predriver, the inverter, the coil set, or an output signal of the sensor and also, drive control for the electric motor cannot be continued, the task switching function unit may cause the motor control unit to stop the drive control for the electric motor as well as execute calculation other than the calculation for drive control for the electric motor.

With this configuration, if it is determined that drive control for the electric motor cannot be continued, the drive control for the electric motor is stopped to thereby improve safety of the device. Further, the calculation capacity, which is saved by stopping the calculation of the control variable, is used for calculation required to execute other tasks, and hence, the calculation capacities of the respective microcontrollers can be efficiently used.

To give another example of the calculation other than the calculation for the drive control for the electric motor, task switching function unit 67 or task switching function unit 77 may execute at least a part of calculation assigned to diagnostic function unit 66 and diagnostic function unit 76.

By the task switching function unit executing at least a part of the calculation assigned to the first diagnostic function unit or second diagnostic function unit, the vehicle control device can maintain its accuracy of abnormality detection without increasing a computation load on a normal microcontroller.

Further, the task switching function unit may also execute at least a part of calculation or processing assigned to the CAN communication unit. Through the cooperation with another on-vehicle device, a driving assist function can be maintained or improved, which encompasses assistance to calculation assigned to the other on-vehicle device, cooperative control with the on-vehicle device, and drive control for a normal actuation unit, which is executed based on information from the on-vehicle device.

It is also possible to take over calculation assigned to a normal motor control unit. Specifically, there is a concern that if drive control for an actuation unit in one system is stopped, and further, a microcontroller of the other system freezes or is reset, a target on-vehicle device cannot be continuously controlled. In this case, if the task switching function unit takes over calculation assigned to the motor control unit, drive control of the vehicle control device can be continued.

Next, specific examples of the task switching processing (steps S11, S31) of FIGS. 5 and 6 are described in detail Task Switching Processing 1

Figure 9:
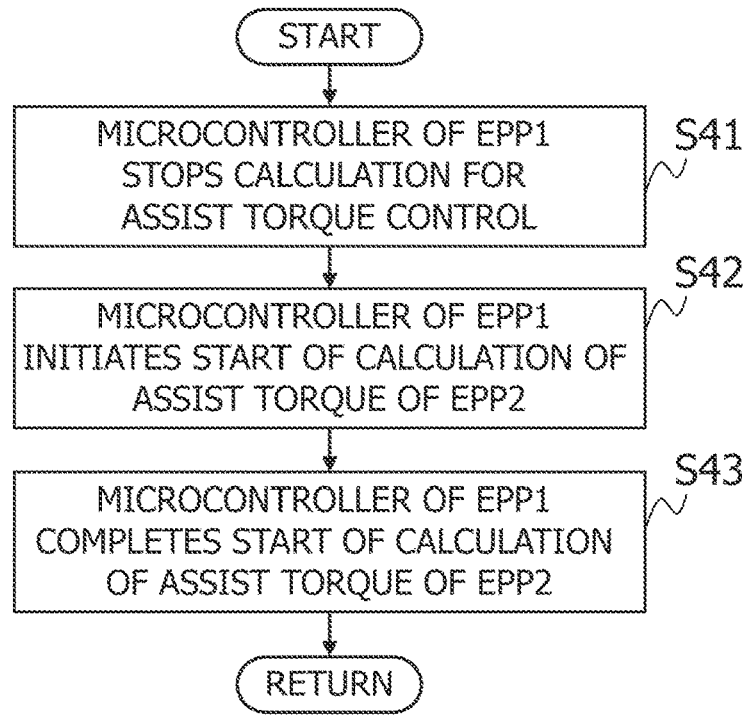
FIG. 9 is a flowchart illustrating a first example of task switching processing of FIG. 5.

FIG. 9 illustrates a first example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 executes a part of calculation assigned to microcontroller 36, and transmits the calculation result to microcontroller 36 via microcomputer intercommunication units 68, 78.

First, in step S41, microcontroller 32 of unit EPP1 is caused to stop calculation for assist torque control. In subsequent step S42, microcontroller 32 of unit EPP1 is caused to initiate the start of calculation of the assist torque, which is assigned to unit EPP2. In subsequent step S43, microcontroller 32 of unit EPP1 completes the start of the calculation of the assist torque, which is assigned to unit EPP2, and the processing returns to step S12.

Figure 10:
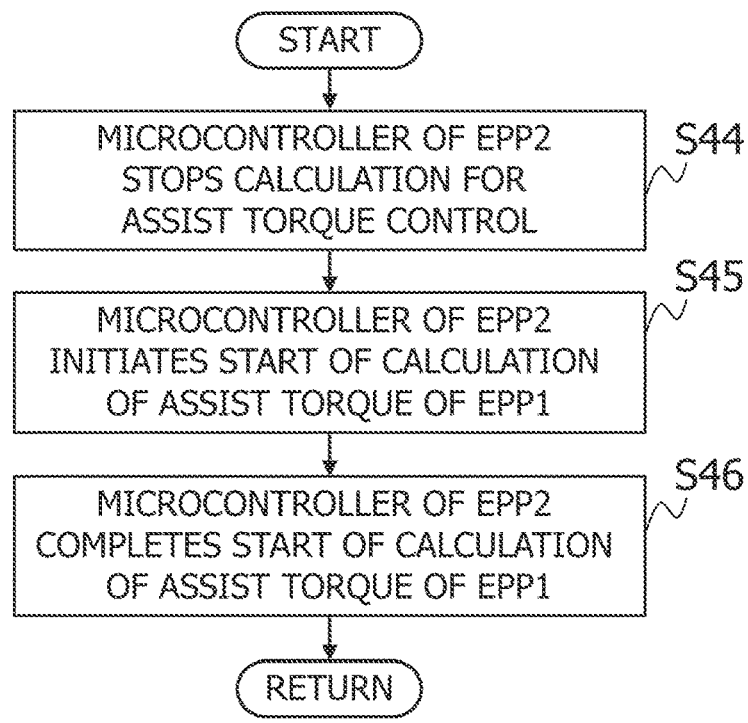
FIG. 10 is a flowchart illustrating a first example of task switching processing of FIG. 6.

FIG. 10 illustrates a first example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 executes a part of calculation assigned to microcontroller 32, and transmits the calculation result to microcontroller 32 via microcomputer intercommunication units 78, 68.

In step S44, microcontroller 36 of unit EPP2 is caused to stop calculation for assist torque control. In subsequent step S45, microcontroller 36 of unit EPP2 is caused to initiate the start of calculation of the assist torque, which is assigned to unit EPP1. In subsequent step S46, microcontroller 36 of unit EPP2 completes the start of calculation of an assist torque, which is assigned to unit EPP1, and the processing returns to step S32.

According to such task switching processing, when only the actuator unit (coil set) in one system is allowed to continue control, the task switching function unit of the other system takes over a part of calculation (in this example, calculation for assist torque control) assigned to the microcomputer of the other system, to thereby reduce computation load on the microcomputer of the other system and improve the reliability of drive control executed by the actuator of the other system.

Task Switching Processing 2

Figure 11:
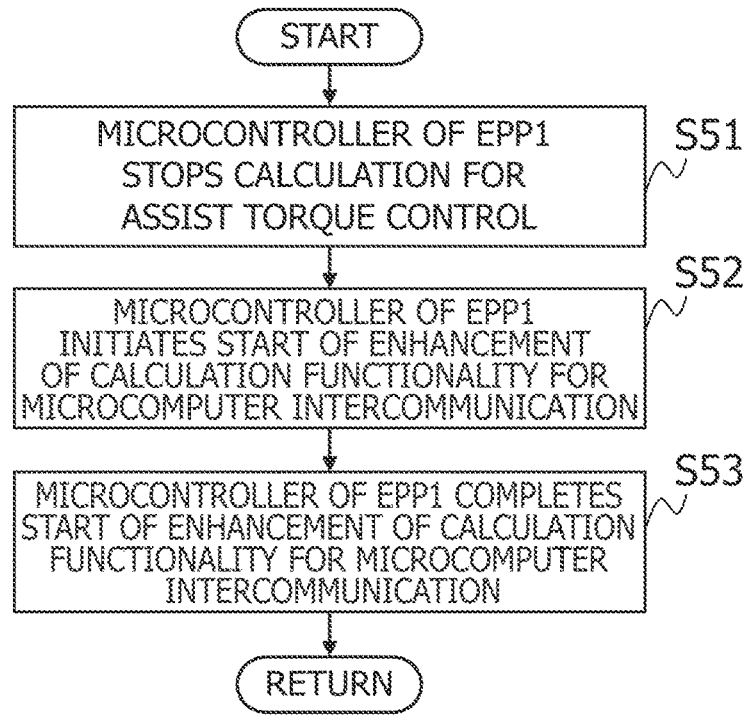
FIG. 11 is a flowchart illustrating a second example of the task switching processing of FIG. 5.

FIG. 11 illustrates a second example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 executes at least a part of calculation or processing assigned to microcomputer intercommunication unit 68.

First, in step S51, microcontroller 32 of unit EPP1 is caused to stop calculation for assist torque control. In subsequent step S52, microcontroller 32 of unit EPP1 is caused to initiate the start of enhancement of calculation functionality for microcomputer intercommunication, which is assigned to unit EPP2. In subsequent step S53, microcontroller 32 of unit EPP1 completes the start of the enhancement of the calculation functionality for microcomputer intercommunication, which is assigned to unit EPP2, and the processing returns to step S12.

Figure 12:
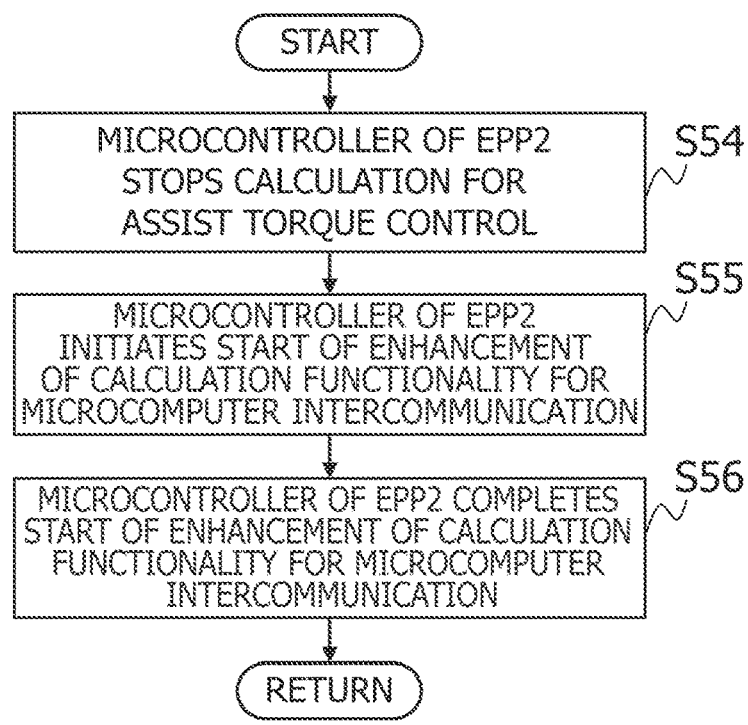
FIG. 12 is a flowchart illustrating a second example of the task switching processing of FIG. 6.

FIG. 12 illustrates a second example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 54, task switching function unit 77 executes at least a part or calculation or processing assigned to microcomputer intercommunication unit 78.

In step S54, microcontroller 36 of unit EPP2 is caused to stop calculation for assist torque control. In subsequent step S55, microcontroller 36 of unit EPP2 is caused to initiate the start of enhancement of calculation functionality for microcomputer intercommunication, which is assigned to unit EPP1. In subsequent step S56, microcontroller 36 of unit EPP2 completes the start of the enhancement of calculation functionality for microcomputer intercommunication assigned to unit EPP1, and the processing returns to step S32.

According to such task switching processing, the task switching function unit in one system executes a part of calculation assigned to the microcomputer intercommunication unit of the other system, by which an amount of information exchanged by microcomputer intercommunication cab be increased, and information of the microcontroller in the one system can be transmitted to the microcontroller of the other system. Consequently, the actuation unit of the microcontroller of the other system can continue control with higher reliability.

Task Switching Processing 3

Figure 13:
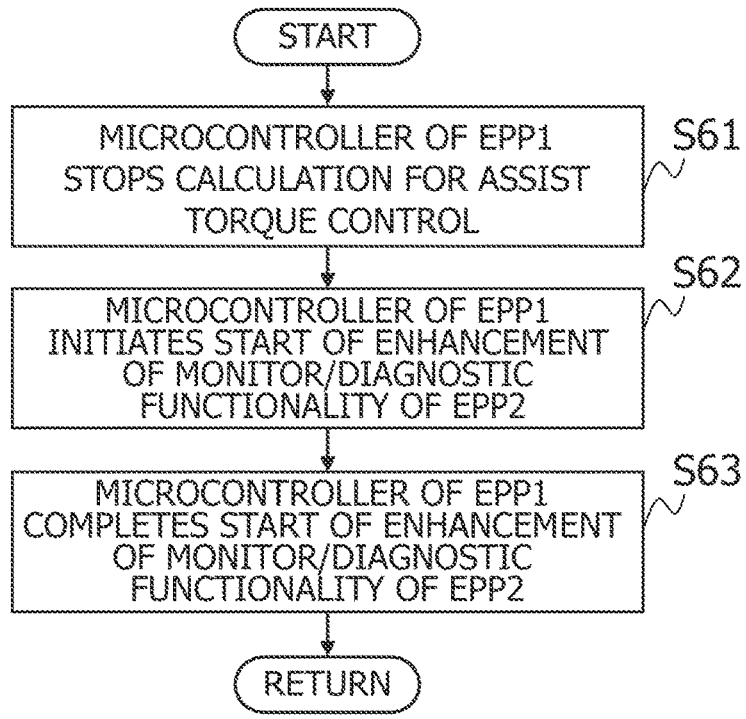
FIG. 13 is a flowchart illustrating a third example of the task switching processing of FIG. 5.

FIG. 13 illustrates a third example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 executes at least a part of calculation or processing assigned to diagnostic function unit 66 or diagnostic function unit 76.

First, in step S61, microcontroller 32 of unit EPP1 is caused to stop calculation for assist torque control. In subsequent step S62, microcontroller 32 of unit EPP1 is caused to initiate the start of enhancement of monitor/diagnostic functionality, which is assigned to unit EPP2. In subsequent step S63, microcontroller 32 of unit EPP1 completes the start of the enhancement of the monitor/diagnostic functionality, which is assigned to unit EPP2, and the processing returns to step S12.

Figure 14:
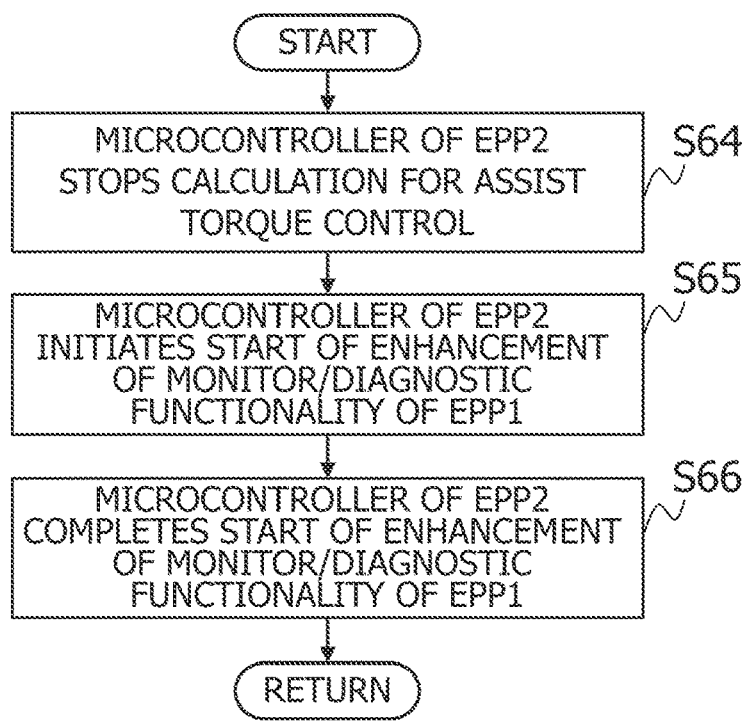
FIG. 14 is a flowchart illustrating a third example of the task switching processing of FIG. 6.

FIG. 14 illustrates a third example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 executes at least a part of calculation or processing assigned to diagnostic function unit 66 or diagnostic function unit 76.

In step S64, microcontroller 36 of unit EPP2 is caused to stop calculation for assist torque control. In subsequent step S65, microcontroller 36 of unit EPP2 initiates the start of enhancement of monitor/diagnostic functionality, which is assigned to unit EPP1. In subsequent step S66, microcontroller 36 of unit EPP2 completes the start of the enhancement of monitor/diagnostic functionality, which is assigned to unit EPP1, and the processing returns to step S32.

With task switching function unit 67 or task switching function unit 77 executing at least one of calculation assigned to diagnostic function unit 66 or diagnostic function unit 76 as above, the vehicle control device can maintain its accuracy of abnormality detection without increasing computation load on microcontroller 32 or 36.

Note that in the configuration that task switching function unit 67 or task switching function unit 77 executes at last a part of calculation assigned to diagnostic function unit 66 or diagnostic function unit 76, a state of sensor 54, predriver 33, inverter 40, coil set 13a, or microcontroller 32 can be recorded on the internal memory of diagnostic function unit 66, or any external memory (not shown).

By recording information about the microcontroller, the sensor, and the actuation unit, especially, how an abnormality has occurred in a host system thereof, the recorded information can be utilized for analyzing their usages during maintenance.

Task Switching Processing 4

Figure 15:
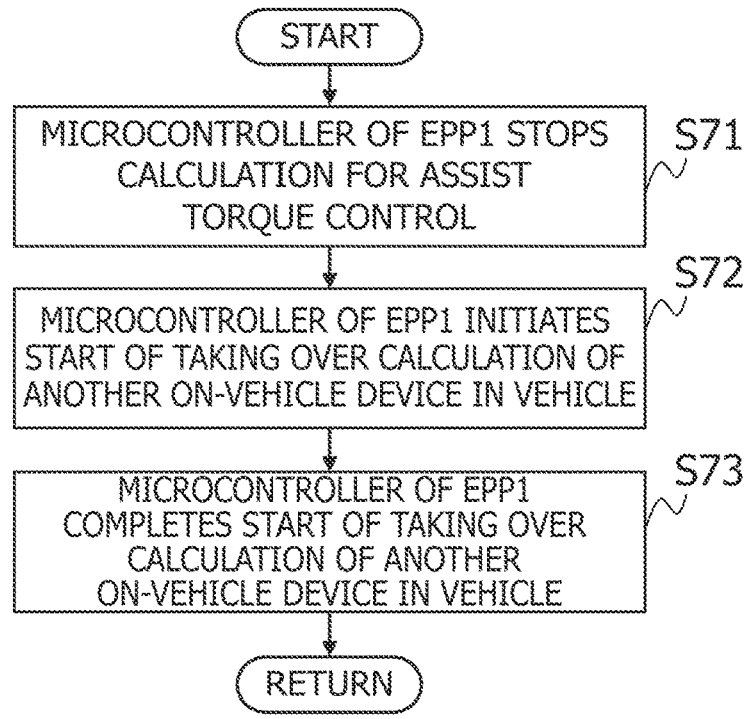
FIG. 15 is a flowchart illustrating a fourth example of the task switching processing of FIG. 5.

FIG. 15 illustrates a fourth example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 executes at least a part of calculation or processing assigned to another on-vehicle device.

First, in step S71, microcontroller 32 of unit EPP1 is caused to stop calculation for assist torque control. In subsequent step S72, microcontroller 32 of unit EPP1 initiates the start of taking over calculation assigned to the other on-vehicle device in the vehicle. In subsequent step S73, microcontroller 32 of unit EPP1 completes the start of taking over the calculation assigned to the other on-vehicle device in the vehicle, and the processing returns to step S12.

Figure 16:
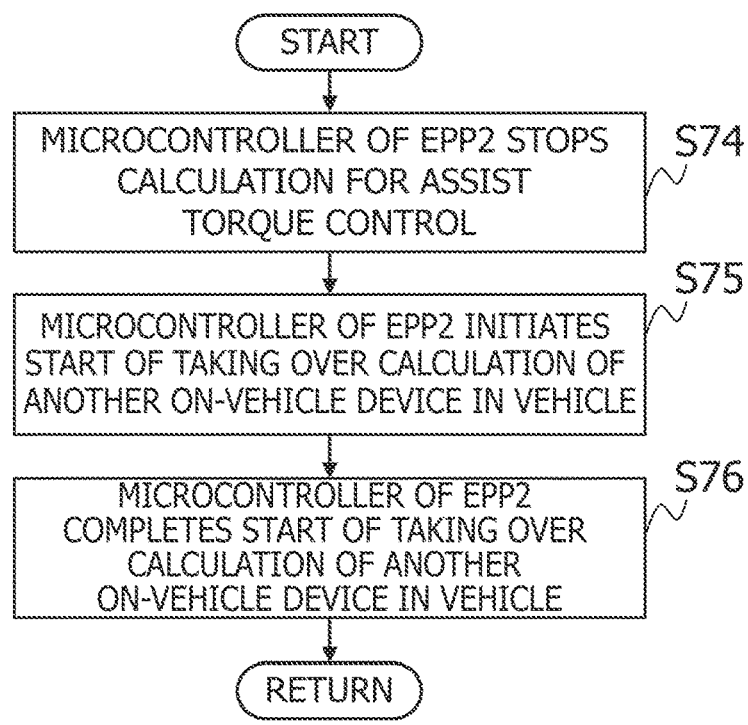
FIG. 16 is a flowchart illustrating a fourth example of the task switching processing of FIG. 6.

FIG. 16 illustrates a fourth example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 executes at least a part of calculation or processing assigned to another on-vehicle device.

In step S74, microcontroller 36 of unit EPP2 is caused to stop calculation for assist torque control. In subsequent step S75, microcontroller 36 of unit EPP2 initiates the start of taking over calculation assigned to the other on-vehicle device in the vehicle. In subsequent step S76, microcontroller 36 of unit EPP2 completes the start of taking over the calculation assigned to the other on-vehicle device in the vehicle, and the processing returns to step S32.

According to such task switching processing, the task switching function unit executes at least a part of the calculation assigned to another on-vehicle device, to thereby enhance the functionality of the entire vehicle without increasing computation load on the other on-vehicle device.

Task Switching Processing 5

Figure 17:
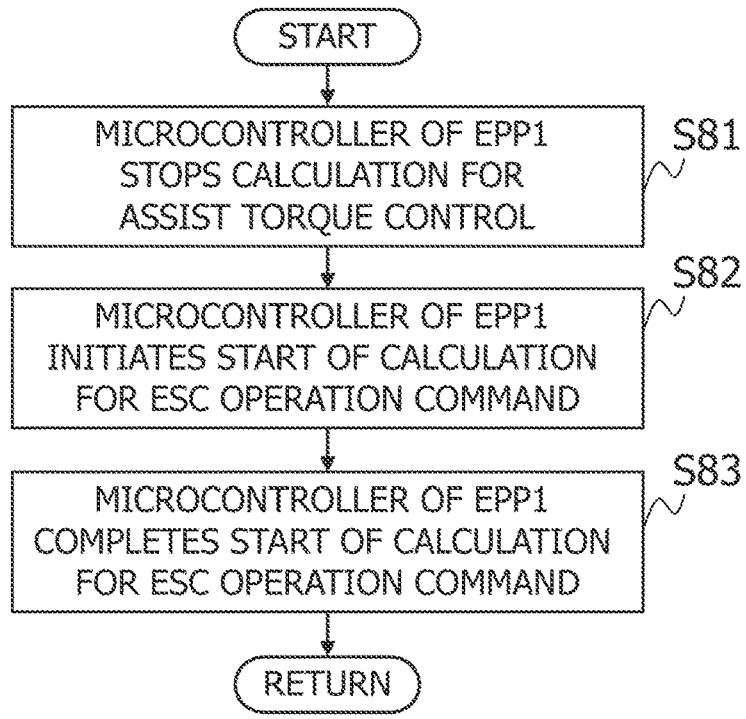
FIG. 17 is a flowchart illustrating a fifth example of the task switching processing of FIG. 5.

FIG. 17 illustrates a fifth example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 outputs a braking force command signal to a braking force control device, e.g., ESC control ECU 4 of FIG. 1, which can apply different braking forces to a pair of turning wheels, so as to execute drive control of the braking force control device to apply different braking forces to the pair of turning wheels to thereby produce a rotational moment of the vehicle.

First, in step S81, microcontroller 32 of unit EPP1 is caused to stop calculation for assist torque control. In subsequent step S82, microcontroller 32 of unit EPP1 initiates the start of calculation for an ESC operation command, which is assigned to ESC control ECU 4 of FIG. 1. In subsequent step S83, microcontroller 32 of unit EPP1 completes the start of the calculation for an ESC operation command, and the processing returns to step S12.

Figure 18:
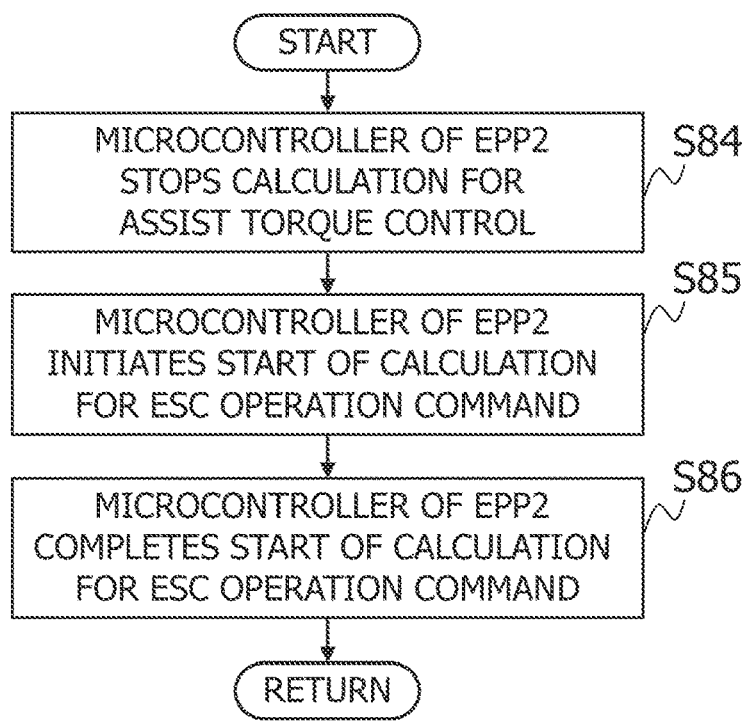
FIG. 18 is a flowchart illustrating a fifth example of the task switching processing of FIG. 6.

FIG. 18 illustrates a fifth example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 outputs a braking force command signal to a braking force control device, e.g., ESC control ECU 4 of FIG. 1, which can apply different braking forces to the pair of turning wheels so as to execute drive control of the braking force control device to apply different braking forces to the pair of turning wheels to thereby produce a rotational moment of the vehicle.

In step S84, microcontroller 36 of unit EPP2 is caused to stop calculation for assist torque control. In subsequent step S85, microcontroller 36 of unit EPP2 initiates the start of calculation for an ESC operation command, which is executed by ESC control ECU 4 of FIG. 1. In subsequent step S86, microcontroller 36 of unit EPP2 completes the calculation for an ESC operation command, and the processing returns to step S32.

According to such task switching processing, when an abnormality has occurred in the electric power steering device, the ESC (braking force control device) produces a rotational moment of the vehicle, to thereby compensate for insufficient steering force and thus improve steering controllability and safety when an abnormality is detected.

Task Switching Processing 6

Figure 19:
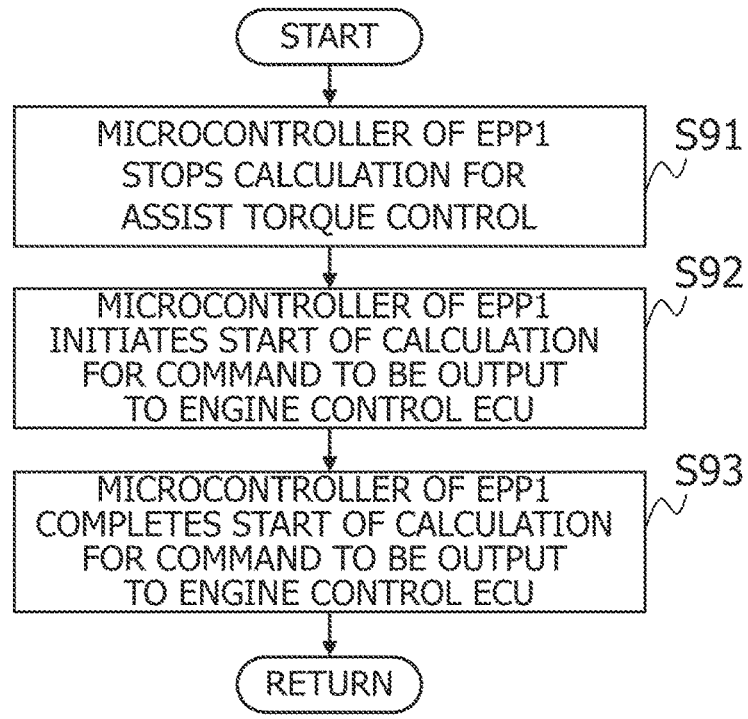
FIG. 19 is a flowchart illustrating a sixth example of the task switching processing of FIG. 5.

FIG. 19 illustrates a sixth example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 outputs an engine control command signal to, for example, engine control ECU (engine controller) 2 of FIG. 1, which controls the combustion by an internal combustion engine of the vehicle, to thereby adjust a combustion condition of the internal combustion engine according to an output single of the first steering sensor or the second steering sensor.

First, in step S91, microcontroller 32 of unit EPP1 is caused to stop calculation for assist torque control. In subsequent step S92, microcontroller 32 of unit EPP1 initiates the 0 start of calculation for a command to be output to the engine control ECU 2. In subsequent step S93, microcontroller 32 of unit EPP1 completes the start of the calculation for a command to be output to the engine control ECU 2, and the processing returns to step S12.

Figure 20:
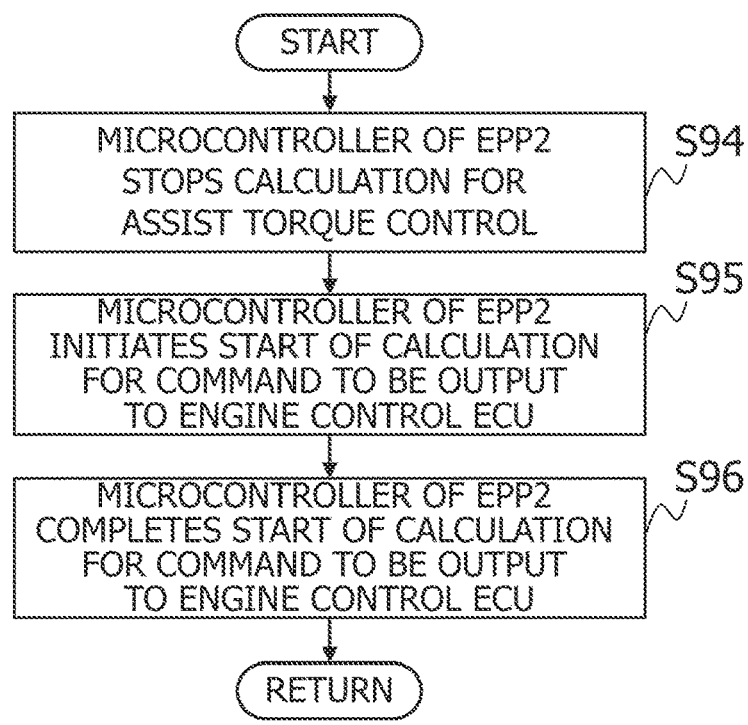
FIG. 20 is a flowchart illustrating a sixth example of the task switching processing of FIG. 6.

FIG. 20 illustrates a sixth example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 outputs an engine control command signal to, for example, engine control ECU 2 of FIG. 1, which controls the combustion by the internal combustion engine of the vehicle, to thereby adjust the combustion condition of the internal combustion engine according to an output signal of the first steering sensor or the second steering sensor.

In step S94, microcontroller 36 of unit EPP2 is caused to stop calculation for assist torque control. In subsequent step S95, microcontroller 36 of unit EPP2 initiates the start of calculation for a command to be output to engine control ECU 2. In subsequent step S96, microcontroller 36 of unit EPP2 completes the start of the calculation for a command to be output to engine control ECU 2, and the processing returns to step S32.

According to such task switching processing, when an abnormality has occurred in the electric power steering device, if it is detected that steering control is being executed by the steering mechanism according to an output signal of the first or second steering sensor for detecting the steering condition of the steering mechanism, engine control is performed by engine braking to reduce the engine rotational speed so that a load is applied to steering wheels as front wheels. This operation makes it possible to compensate for insufficient steering force and thus improve steering controllability and safety when an abnormality is detected.

Note that the task switching function unit (abnormal state-specific task executing unit) may be configured to, when the diagnostic function unit (abnormality determination unit) in one system determines that an abnormality has occurred in the predriver, the inverter, the coil set, or an output signal of the sensor, transmit to the microcontroller of the other system a signal that causes the motor to be driven with varying assist torque.

By the motor being driven with varying assist torque when an abnormality is detected, a driver feels like the steering wheel is vibrating and thus can notice an abnormality of the device. Further, the abnormal state-specific task executing unit executes calculation for generating the vibrations so as to prevent an increase in computation load on the microcomputer as well as notify a driver of an abnormality.

Task Switching Processing 7

Figure 21:
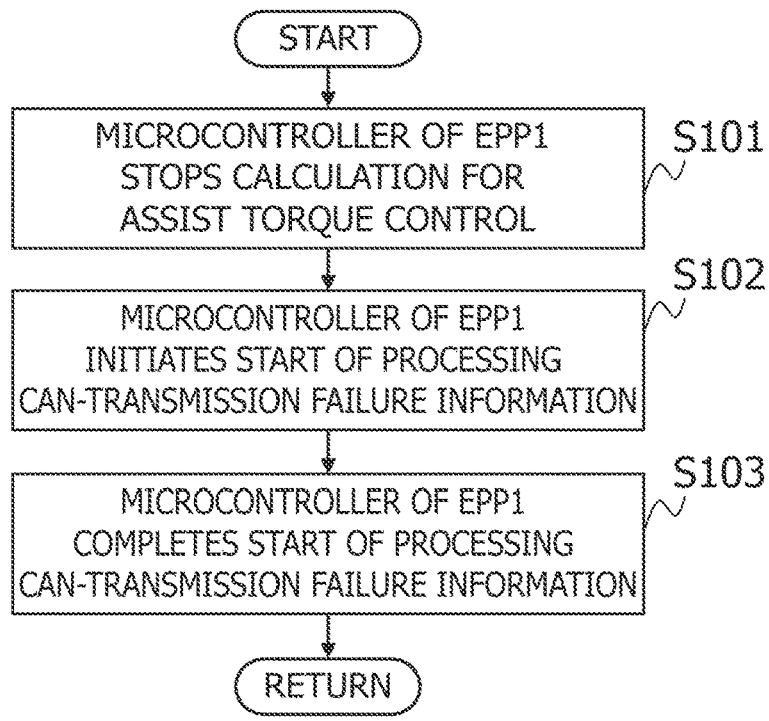
FIG. 21 is a flowchart illustrating a seventh example of the task switching processing of FIG. 5.

FIG. 21 illustrates a seventh example of the task switching processing in step S11 of FIG. 5. Specifically, in this example, when diagnostic function unit 66 determines that an abnormality has occurred in predriver 33, inverter 40, coil set 13a, or an output signal of sensor 54, task switching function unit 67 executes processing to allow transmission to another on-vehicle device via CAN communication unit 62.

First, in step S101, microcontroller 32 of unit EPP1 is caused to stop calculation for assist torque control. In subsequent step S102, microcontroller 32 of unit EPP1 initiates the start of processing CAN-transmission failure information. In subsequent step S103, microcontroller 32 of unit EPP1 completes the start of processing the CAN-transmission failure information, and the processing returns to step S12.

Figure 22:
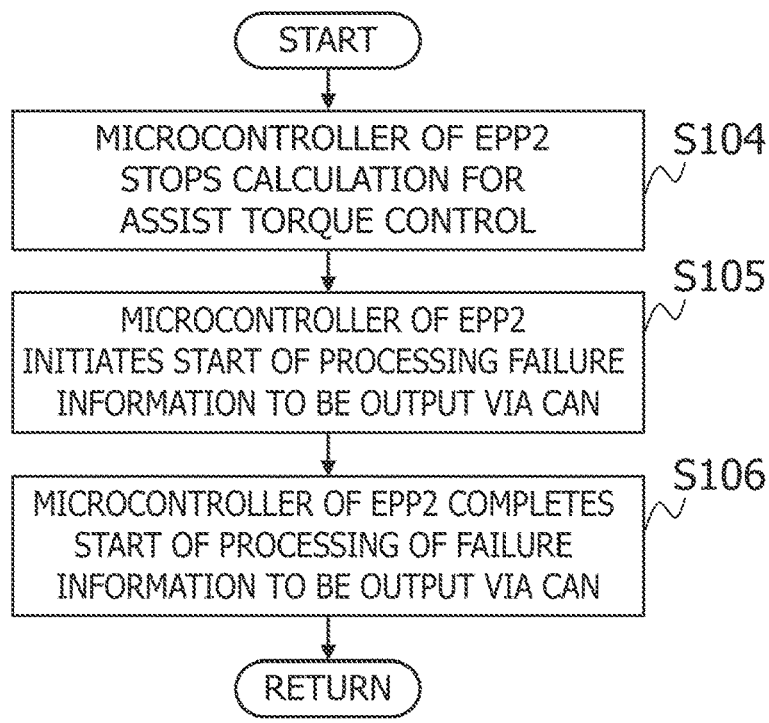
FIG. 22 is a flowchart illustrating a seventh example of the task switching processing of FIG. 6.

FIG. 22 illustrates a seventh example of the task switching processing in step S31 of FIG. 6. Similar to the task switching processing in step S11, when diagnostic function unit 76 determines that an abnormality has occurred in predriver 37, inverter 41, coil set 13b, or an output signal of sensor 55, task switching function unit 77 executes processing to allow transmission to another on-vehicle device via CAN communication unit 72.

In step S104, microcontroller 36 of unit EPP2 is caused to stop calculation for assist torque control. In subsequent step S105, microcontroller 36 of unit EPP2 initiates the start of processing CAN-transmission failure information. In subsequent step S106, microcontroller 36 of unit EPP2 completes the start of processing the CAN-transmission failure information, and the processing returns to step S32.

As described above, information detected by the diagnostic function unit is processed, not used as it is, into a form transmissible via the CAN and also processable by another on-vehicle device that is to receive the information. This processing makes it possible to suitably share abnormality information of a certain on-vehicle device with the other on-vehicle device without increasing computation load on the other on-vehicle device.

Note that the other on-vehicle device may transmit, to the outside of the vehicle, the information about an abnormality in the predriver, the inverter, the coil set, or an output signal of the sensor.

For example, if the abnormality information is transmitted to an automotive service center, an insurance company, or a driving management company, it is possible to properly send a driving instruction to the vehicle, arrange a tow truck or repair, or perform other subsequent operations of handling the trouble.

Further, when the diagnostic function unit in one system determines that an abnormality has occurred in the predriver, the inverter, the coil set, or an output signal of the sensor, the task switching function unit may record this abnormality information and information about a status of a corresponding microcontroller on a memory of the diagnostic function unit of the other system or an external memory (not shown).

With the abnormality information being shared with the other on-vehicle device and also recorded to the microcontroller, the condition analysis can be performed with high accuracy during maintenance.

Note that the present invention is not limited to the above embodiments and encompasses various modifications within the gist of the invention. For example, in the above embodiments, the first and second microcontrollers each include the task switching function unit, but either of them may include the task switching function unit.

Further, two or more of the task switching processings 1 to 7 can be, of course, freely selected and used in combination.

REFERENCE SYMBOL LIST

13 Electric motor (first, second actuation unit)
32 Microcontroller (first microcomputer)
36 Microcontroller (second microcomputer)
54 Sensor (first sensor)
55 Sensor (second sensor)
61 Input signal processing unit (first sensor signal input unit)
63 Assist control/external command control unit (first control variable calculation unit)
65 Motor control unit (first drive control unit)
66 Diagnostic function unit (first abnormality determination unit)
67 Task switching function unit (abnormal state-specific task executing unit)
68, 78 Microcomputer intercommunication unit
71 Input signal processing unit (second sensor signal input unit)
73 Assist control/external command control unit (second control variable calculation unit)
75 Motor control unit (second drive control unit)
76 Diagnostic function unit (second abnormality determination unit)
77 Task switching function unit (abnormal state-specific task executing unit)

The invention claimed is:
1. A vehicle control device comprising:
a first sensor configured to detect a state variable indicating an operational state of a vehicle;
a first actuator configured to operate based on an output signal of the first sensor;
a first microcomputer configured to control the first actuator,
the first microcomputer including:
a first sensor signal receiver configured to receive an output signal of the first sensor;
a first processor configured to calculate a first control variable used to execute drive control for the first actuator based on the output signal of the first sensor;
execute drive control for the first actuator based on the first control variable; and
determine presence or absence of an abnormality in the first actuator or the output signal of the first sensor;
a second sensor configured to detect a state variable indicating an operational state of the vehicle;
a second actuator configured to operate based on an output signal of the second sensor;
a second microcomputer configured to control the second actuator,
the second microcomputer including:
a second sensor signal receiver configured to receive the output signal of the second sensor;
a second processor configured to calculate a second control variable used to execute drive control for the second actuator based on the output signal of the second sensor;
execute drive control for the second actuator based on the second control variable;
determine presence or absence of an abnormality in the second actuator or the output signal of the second sensor; and
upon determining that an abnormality has occurred in the second actuator or the output signal of the second sensor, stop calculation of the second control variable and stop drive control for the second actuator, and execute calculation for one or more functions including a diagnosis function, a CAN communication function, or a motor control function, the calculation differing from the calcu- lation of the second control variable and the drive control for the second actuator; and a microcomputer interface configured to execute microcomputer intercommunication that corresponds to transmission or reception of a signal between the first microcomputer and the second microcomputer.

2. The vehicle control device according to claim 1, wherein when the second processor is configured such that, upon determining that an abnormality has occurred in the second actuator or the output signal of the second sensor, and drive control for the second actuator cannot be continued, the second processor stops drive control for the second actuator and executes calculation for the one or more functions including the diagnosis function, the CAN communication function, or the motor control function.

3. The vehicle control device according to claim 1, wherein the second processor is configured such that upon determining that an abnormality has occurred in the second actuator or the output signal of the second sensor, the second processor executes a calculation which is assigned to the first microcomputer, and transmits a calculation result to the first microcomputer via the microcomputer interface.

4. The vehicle control device according to claim 3, wherein the second processor is configured such that upon determining that an abnormality has occurred in the second actuator or the output signal of the second sensor, the second processor executes calculation which is assigned to the microcomputer interface.

5. The vehicle control device according to claim 1, wherein the second processor is configured such that upon determining that an abnormality has occurred in the second actuator or the output signal of the second sensor, the second processor executes a calculation which is assigned to the first processor or the second processor.

6. The vehicle control device according to claim 5, wherein the second processor is configured such that, upon determining that an abnormality has occurred in the second actuator or the output signal of the second sensor, the second processor records a status of the first sensor, the first actuator, or the first microcomputer.

7. The vehicle control device according to claim 1,
wherein the first microcomputer or the second microcomputer includes a controller area network (CAN) communication processor configured to execute CAN communication with another on-vehicle device, and
wherein upon determining that an abnormality has occurred in the second actuator or the output signal of the second sensor, the second processor executes a calculation which is assigned to the CAN communication processor.

8. The vehicle control device according to claim 1,
wherein the first microcomputer or the second microcomputer includes a controller area network (CAN) communication processor configured to execute CAN communication with another on-vehicle device, and
wherein upon determining that an abnormality has occurred in the second actuator or the output signal of the second sensor, the second processor executes a calculation which is assigned to the other on-vehicle device.

9. The vehicle control device according to claim 8,
wherein the vehicle control device comprises a power steering device,
the power steering device including:
a steering mechanism configured to transmit a steering operation of a steering wheel to a pair of turning wheels;
an electric motor serving as the first actuator and the second actuator, which is configured to apply a steering force to the steering mechanism; and
a first steering sensor and a second steering sensor as the first sensor and the second sensor which are configured to detect a steering condition of the steering mechanism,
wherein the first processor executes drive control for the first actuator by use of a first control variable that is calculated based on an output signal of the first steering sensor,
wherein the second processor executes drive control for the second actuator by use of a second control variable that is calculated based on an output signal of the second steering sensor,
wherein the second processor is configured such that upon determining that an abnormality has occurred in the second actuator or the output signal of the second sensor, the second processor outputs a braking force command signal to a braking force control device configured to apply different braking forces to the pair of turning wheels, and
wherein the braking force command signal is output to execute drive control of the braking force control device so that the braking force control device applies different braking forces to the pair of turning wheels to thereby produce a rotational moment of the vehicle.

10. The vehicle control device according to claim 8,
wherein the vehicle control device comprises a power steering device,
the power steering device including:
a steering mechanism configured to transmit a steering operation of a steering wheel to a pair of turning wheels;
an electric motor as the first actuator and the second actuator, which is configured to apply a steering force to the steering mechanism; and
a first steering sensor and a second steering sensor as the first sensor and the second sensor, which are configured to detect a steering condition of the steering mechanism,
wherein the first processor executes drive control for the first actuator by use of a first control variable calculated based on an output signal of the first steering sensor,
wherein the second processor executes drive control for the second actuator by use of a second control variable calculated based on an output signal of the second steering sensor,
wherein the second processor is configured such that upon determining that an abnormality has occurred in the second actuator or the output signal of the second sensor, the second processor causes an engine control command signal to be output to an engine controller configured to control combustion of an internal combustion engine of the vehicle, and
wherein the engine control command signal is output to adjust a combustion condition of the internal combustion engine according to an output signal of the first steering sensor or an output signal of the second steering sensor.

11. The vehicle control device according to claim 1,
wherein the vehicle control device comprises a power steering device,
the power steering device including:
a steering mechanism configured to transmit a steering operation of a steering wheel to a pair of turning wheels;

an electric motor as the first actuator and the second actuation unit actuator, which is configured to apply a steering force to the steering mechanism; and a first steering sensor and a second steering sensor as the first sensor and the second sensor, which are configured to detect a steering condition of the steering mechanism, wherein the first processor executes drive control for the first actuator by use of a first control variable calculated based on an output signal of the first steering sensor, wherein the second processor executes drive control for the second actuator by use control variable calculated based on an output signal of the second steering sensor, and wherein the second processor is configured such that upon determining that an abnormality has occurred in the second actuator or the output signal of the second sensor, the second processor causes a signal to be output to drive the first actuator with varying assist torque to create vibration.

12. The vehicle control device according to claim 1, wherein upon determining that an abnormality has occurred in the second actuator or the output signal of the second sensor, the second processor executes calculation assigned to the first processor.

13. The vehicle control device according to claim 1, wherein the first microcomputer or the second microcomputer includes a controller area network (CAN) communication processor configured to perform CAN communication with another on-vehicle device, and wherein the second processor is configured to process information about an abnormality in the second actuator or the output signal of the second sensor, determined by the second processor, into a form transmissible to the other on-vehicle device via the CAN communication processor.

14. The vehicle control device according to claim 13, wherein the other on-vehicle device is configured to transmit the information about the abnormality in the second actuator or the output signal of the second sensor.

15. The vehicle control device according to claim 13, wherein the second processor is configured such that upon determining that an abnormality has occurred in the second actuator or the output signal of the second sensor, the second processor records a status of the first sensor, the first actuator, or the first microcomputer.

* * * * *